US009103223B2

(12) United States Patent
Uehara et al.

(10) Patent No.: US 9,103,223 B2
(45) Date of Patent: Aug. 11, 2015

(54) SHAFT SEALING DEVICE AND ROTATING MACHINE COMPRISING SAME

(71) Applicant: MITSUBISHI HEAVY INDUSTRIES, LTD., Tokyo (JP)

(72) Inventors: Hidekazu Uehara, Tokyo (JP); Tanehiro Shinohara, Tokyo (JP); Yukihiro Hashimoto, Tokyo (JP); Shin Nishimoto, Tokyo (JP); Takashi Nakano, Tokyo (JP); Masato Araki, Tokyo (JP); Keita Takamura, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/347,457

(22) PCT Filed: Oct. 25, 2012

(86) PCT No.: PCT/JP2012/077584
§ 371 (c)(1),
(2) Date: Mar. 26, 2014

(87) PCT Pub. No.: WO2013/062040
PCT Pub. Date: May 2, 2013

(65) Prior Publication Data
US 2014/0241877 A1    Aug. 28, 2014

(30) Foreign Application Priority Data
Oct. 26, 2011  (JP) .................................. 2011-234825

(51) Int. Cl.
*F16J 15/447* (2006.01)
*F01D 11/00* (2006.01)
(Continued)

(52) U.S. Cl.
CPC ................ *F01D 11/001* (2013.01); *F02C 7/28* (2013.01); *F16J 15/3292* (2013.01); *F05D 2240/57* (2013.01)

(58) Field of Classification Search
CPC ...................................................... F16J 15/3292
USPC ............................................................. 277/355
See application file for complete search history.

(56) References Cited

U.S. PATENT DOCUMENTS

| 5,755,445 A | 5/1998 | Arora |
| 6,267,381 B1 | 7/2001 | Wright |

(Continued)

FOREIGN PATENT DOCUMENTS

| CN | 1410690 | 4/2003 |
| EP | 1 013 975 | 6/2000 |

(Continued)

OTHER PUBLICATIONS

International Search Report issued Feb. 5, 2013 in International (PCT) Application No. PCT/JP2012/077584 with English translation.

(Continued)

*Primary Examiner* — Gilbert Lee
(74) *Attorney, Agent, or Firm* — Wenderoth, Lind & Ponack, L.L.P.

(57) ABSTRACT

A shaft sealing device is provided in an annular space between a rotor and a stator surrounding an outer periphery of the rotor, and divides the annular space in the direction of an axis of the rotor into a high-pressure region and a low-pressure region. The shaft sealing device includes a seal body obtained by stacking a plurality of thin plate sealing pieces in a circumferential direction of the rotor; and a high-pressure side plate that extends from the stator toward the radial inner side so as to run along the high-pressure side of the seal body, and is segmented into a plurality of portions in the circumferential direction, and includes a rigidity imparting member configured to impart rigidity in the direction of the axis to a portion of the surface of the high-pressure side plate that faces the high-pressure region.

6 Claims, 12 Drawing Sheets

(51) Int. Cl.
*F16J 15/32* (2006.01)
*F02C 7/28* (2006.01)

(56) References Cited

U.S. PATENT DOCUMENTS

| | | | |
|---|---|---|---|
| 6,308,957 | B1 * | 10/2001 | Wright .......................... 277/355 |
| 2005/0006968 | A1 | 1/2005 | Beichl et al. |
| 2006/0208427 | A1 * | 9/2006 | Wright et al. ................. 277/413 |
| 2009/0322028 | A1 * | 12/2009 | Wright et al. ................. 277/301 |

FOREIGN PATENT DOCUMENTS

| | | |
|---|---|---|
| EP | 2039887 | 3/2009 |
| EP | 2357385 | 8/2011 |
| GB | 2 286 434 | 8/1995 |
| JP | 2002-013647 | 1/2002 |
| JP | 3616016 | 2/2005 |
| JP | 2006-112491 | 4/2006 |
| JP | 3917997 | 5/2007 |
| JP | 4031699 | 1/2008 |
| JP | 2008-128276 | 6/2008 |
| JP | 2008-275157 | 11/2008 |
| JP | 2009-243685 | 10/2009 |
| JP | 2009-281437 | 12/2009 |
| WO | 00/03164 | 1/2000 |
| WO | 01/48887 | 7/2001 |

OTHER PUBLICATIONS

International Preliminary Report on Patentability and Written Opinion of the International Searching Authority issued Feb. 5, 2013 in International (PCT) Application No. PCT/JP2012/077584 with English translation.
Office Action issued Feb. 26, 2015 in corresponding Korean Patent Application No. 10-2014-7007425 with English Translation.
Supplementary Partial European Search Report issued May 4, 2015 in corresponding European Patent Application No. 12844359.5.
Office Action issued Apr. 28, 2015 in corresponding Chinese Patent Application No. 201280047231.7 with partial English translation.

* cited by examiner

SHAFT SEALING DEVICE AND ROTATING MACHINE COMPRISING SAME

TECHNICAL FIELD

The present invention relates to a shaft sealing device that seals an annular space between a rotor and a stator to divide the annular space into a low-pressure region and a high-pressure region, and a rotating machine comprising the same.

Priority is claimed on Japanese Patent Application No. 2011-234825, filed Oct. 26, 2011, the content of which is incorporated herein by reference.

BACKGROUND ART

A shaft sealing device is provided around a rotor in a rotating machine, such as a gas turbine or a steam turbine, in order to reduce the leak amount of a working fluid that flows from a high-pressure side to a low-pressure side. As an example of this shaft sealing device, for example, a shaft sealing device described in the following Patent Document 1 is known.

This shaft sealing device includes a housing provided at the stator, and a seal body including multiple thin plate sealing pieces.

In the seal body, the multiple thin plate sealing pieces are stacked with small clearances between each other such that the thickness direction of each thin plate sealing piece is directed to the circumferential direction of the rotor. The respective thin plate sealing pieces are obliquely arranged so that the end portions (tips) of the thin sealing pieces on a radial inner side are located further toward a forward side in the rotational direction of the rotor than the end portions (rear ends) of the thin sealing pieces on a radial outer side, the rear ends thereof are coupled to each other at the rear ends thereof, and the tips of the thin sealing pieces are free ends.

In the shaft sealing device schematically configured in this way, the tip of each thin plate sealing piece comes into contact with the rotor when the rotor remains stationary. If the rotor rotates, the tips of the thin plate sealing pieces are lifted from the outer periphery of the rotor by a dynamic pressure effect produced by the rotation of the rotor, and are brought into non-contact with the rotor. For this reason, in the shaft sealing device, wear of each thin plate sealing piece is reduced, and the service life of a seal becomes long.

Additionally, in the above-described mechanism, one axial end portion of the seal body on a fluid low-pressure region side in an axial direction is covered with a low-pressure side plate, and the other axial end portion of the seal body on a fluid high-pressure region side in the axial direction is covered with a high-pressure side plate. Also, the flow of the working fluid to the small clearances between the thin plate sealing pieces is regulated by the low-pressure side plate and the high-pressure side plate.

Here, the low-pressure side plate and the high-pressure side plate are usually segmented into a plurality of portions in the circumferential direction and are disposed with segmentation clearances between each other.

RELATED ART DOCUMENTS

Patent Document

[Patent Document 1] Japanese Patent No. 3616016

SUMMARY OF THE INVENTION

Problems to be Solved by the Invention

Incidentally, in the rotating machine, a swirl flow may be produced in the rotational direction. If the above-described shaft sealing device is applied to a place where the speed of such a swirl flow is fast, due to the swirl flow on the fluid high-pressure region side and an uneven flow in the vicinity of a segmented portion of the high-pressure side plate or the low-pressure side plate, pressure fluctuation may occur in the high-pressure side plate and fluttering may occur in the high-pressure side plate. In this case, the high-pressure side plate may malfunction, for example, in a place including the vicinity of the segmented portion of the high-pressure side plate.

The present invention has been made in consideration of such circumstances, and an object thereof is to provide a shaft sealing device that can prevent fluttering, and a rotating machine including the same.

Means for Solving the Problems

According to a first aspect of the present invention, a shaft sealing device is provided in an annular space between a rotor and a stator surrounding an outer periphery of the rotor to divide the annular space into a high-pressure region and a low-pressure region in the direction of an axis of the rotor. The shaft sealing device includes a seal body having a plurality of thin plate sealing pieces that extend from the stator toward a radial inner side of the rotor and are stacked in a circumferential direction of the rotor; a high-pressure side plate that extends from the stator toward the radial inner side so as to run along the high-pressure side of the seal body, and is segmented into a plurality of portions in the circumferential direction; and a rigidity imparting member configured to impart rigidity in the direction of the axis to a portion of a surface of the high-pressure side plate that faces the high-pressure region.

In such a shaft sealing device, the high-pressure side plate is provided with the rigidity imparting member. Therefore, the rigidity of the high-pressure side plate in the thickness direction can be increased. This can increase strength against vibration and prevent fluttering.

Additionally, since the rigidity imparting member is only provided at a portion of the high-pressure side plate, the rigidity of the high-pressure side plate is not excessively increased. Hence, although the rigidity of the high-pressure side plate is increased, flexibility remains to such a degree to cope with a change in the shape of the seal body. Therefore, the high-pressure side plate can be made to reliably contact and follow the side surface of the seal body.

Additionally, in the above-described shaft sealing device, the rigidity imparting member is a supporting plate portion that extends from the stator toward the radial inner side so as to be stacked on the surface of the high-pressure side plate that faces the high-pressure region and that has an extending length set to be shorter than that of the high-pressure side plate.

According to this configuration, the rigidity of the high-pressure side plate can be reliably increased by a supporting plate portion.

Additionally, since the supporting plate portion is not provided at the portion of the high-pressure side plate on the radial inner side, the flexibility of the portion of the high-pressure side plate on the radial inner side can be secured, and the portion can be reliably made to follow the seal body.

Moreover, in the above-described shaft sealing device, it is preferable that the supporting plate portion have a plurality of plate pieces stacked in the direction of the axis, and the plurality of plate pieces have a shorter extending length as they are arranged further toward the high-pressure region.

Accordingly, the rigidity can be increased gradually from the radial inner side toward the radial outer side, and the followability to the seal body can be secured gradually from the radial outer side toward the radial inner side.

Additionally, in the above-described shaft sealing device, the rigidity imparting member may be a plurality of ribs that are provided at intervals in the circumferential direction on the surface of the high-pressure side plate that faces the high-pressure region.

According to this configuration, the high-pressure side plate is reinforced by the ribs, and the rigidity thereof can be reliably increased.

Additionally, since flexibility can be secured in a place where the ribs are not provided, the high-pressure side plate can be reliably made to follow the seal body.

Moreover, in the above-described shaft sealing device, it is preferable that the thin plate sealing pieces extend toward a forward side in a rotational direction of the rotor as they go toward the radial inner side, and the ribs extend toward the forward side in the rotational direction as they go toward the radial inner side.

Accordingly, since the ribs can be provided over the whole region of the high-pressure side plate, the rigidity of the high-pressure side plate can be increased over the whole region.

Additionally, in the above-described shaft sealing device, the rigidity imparting member may be an elastic member that presses a portion of the high-pressure side plate from the high-pressure region side toward the low-pressure region side.

According to this configuration, the elastic member can press the high-pressure side plate toward the seal body to thereby impart rigidity to the high-pressure side plate, and the vibration of the high-pressure side plate when the rotor has rotated can be suppressed.

Moreover, the shaft sealing device of the present invention may include a plurality of fins, which extend in the radial direction, are provided at intervals in the circumferential direction, and suppress a fluid that flows in the circumferential direction, on the high-pressure region side of the rigidity imparting member.

According to this configuration, by virtue of the fins, the swirl flow in the high-pressure region can be reduced, and an uneven flow can be suppressed, so that the fluttering of the high-pressure side plate can be reliably prevented.

According to a second aspect of the present invention, a rotating machine includes any one of the above-described shaft sealing devices.

According to this configuration, any one of the above-described shaft sealing devices is included. Therefore, it is possible to provide a rotating machine that can make the high-pressure side plate follow the seal body, can increase the rigidity of the high-pressure side plate, and can prevent the fluttering.

Advantageous Effects of Invention

According to the shaft sealing device of the present invention and the rotating machine including the same, the followability of the high-pressure side plate to the seal body can be secured while the rigidity of the high-pressure side plate can be increased by the rigidity imparting member. Therefore, it is possible to prevent fluttering.

DESCRIPTION OF EMBODIMENTS

First Embodiment

A rotating machine according to a first embodiment of the present invention will be described below with reference to the drawings.

Figure 1:
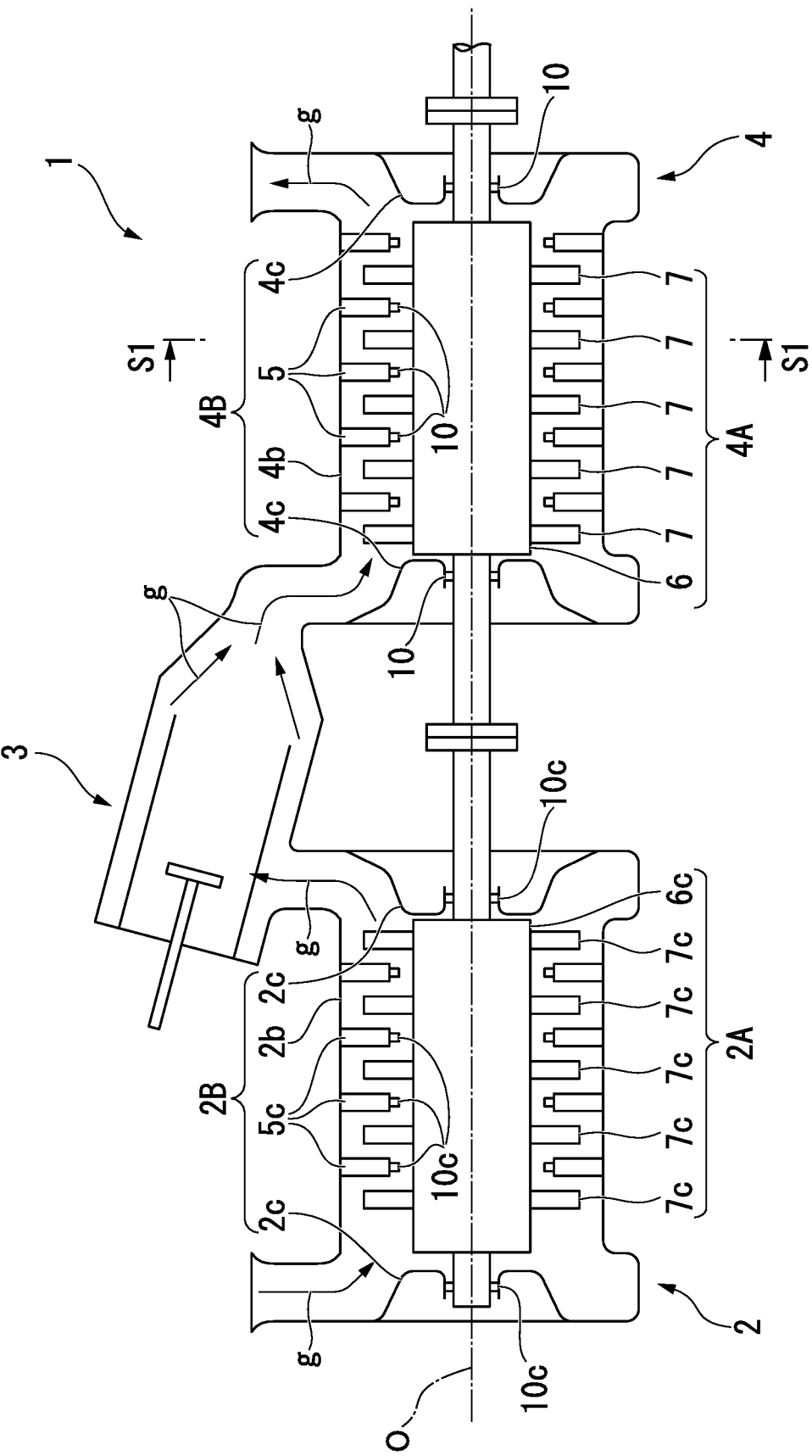
FIG. 1 is a schematic overall configuration view of a gas turbine (rotating machine) according to an embodiment of the present invention.

FIG. 1 is a schematic overall configuration view of a gas turbine (rotating machine) 1 according to the embodiment of the present invention.

The gas turbine 1, as shown in FIG. 1, includes a compressor (rotating machine) 2, a combustor 3, and a turbine (rotating machine) 4.

The compressor 2 takes a large amount of air thereinto and compresses the air. The combustor 3 mixes the compressed air compressed by the compressor 2 with fuel and combusts the resulting mixture. The turbine 4 converts the heat energy of the combustion gas introduced from the combustor 3 into rotational energy.

The compressor 2 and the turbine 4 respectively include rotors 2A and 4A that are coupled together so as to integrally rotate, and stators 2B and 4B that surround the outer peripheries of the rotors 2A and 4A. In addition, in the following description, unless particularly mentioned, the direction of an axis O of the rotors 2A and 4A is simply referred to as a "direction of the axis O", the circumferential direction of the rotors 2A and 4A is simply referred to as a "circumferential direction", and the radial direction of the rotors 2A and 4A is simply referred to as a "radial direction".

The rotor 2A, 4A has a rotating shaft 6c, 6 and a plurality of annular compressor blade group 7c and turbine blade group 7 that are fixed at intervals in the direction of the axis O. Each annular compressor blade group 7c and turbine blade group 7 is configured to have a plurality of compressor blades and turbine blades that are fixed at intervals from each other in the circumferential direction, at the outer periphery of the rotating shaft 6c, 6.

Each stator 2B, 4B includes a casing 2b, 4b, and a plurality of annular compressor vane group 5c and turbine vane group 5 that are fixed at intervals in the direction of the axis O within the casing 2b, 4b.

The annular compressor vane group 5c and turbine vane group 5 is configured to have a plurality of compressor vanes and turbine vanes that are fixed at intervals from each other in the circumferential direction on the inner surface of each casing 2b, 4b. A hub shroud is formed at the tip of each compressor vane and turbine vane. The hub shrouds (stators) are coupled together in the circumferential direction, become annular as a whole, and surround the outer periphery of the rotating shaft 6c, 6.

The annular compressor vane group 5c and turbine vane group 5 are arranged in the direction of the axis O alternately with the plurality of annular compressor blade group 7c and turbine blade group 7.

In the compressor 2 and the turbine 4, in order to prevent a working fluid (compressed air or combustion gas) g from leaking out in the direction of the axis O from a high-pressure side to a low-pressure side, as shown in FIG. 1, a shaft sealing device 10c, 10 is provided at the hub shrouds of each annular compressor vane and turbine vane group 5c, 5. Additionally, in order to prevent the working fluid g from leaking from the high-pressure side to the low-pressure side, shaft sealing devices 10c, 10 are provided also at bearings (stators) 2c, 4c where the casings 2b, 4b support the rotating shaft 6c, 6.

An embodiment of a shaft sealing device 10 of the turbine 4 will be described below. In addition, the shaft sealing device 10 of the turbine 4 will be described below, and since the shaft sealing device 10c of the compressor 2 also has basically the same configuration, a description thereof is omitted here.

Figure 2:
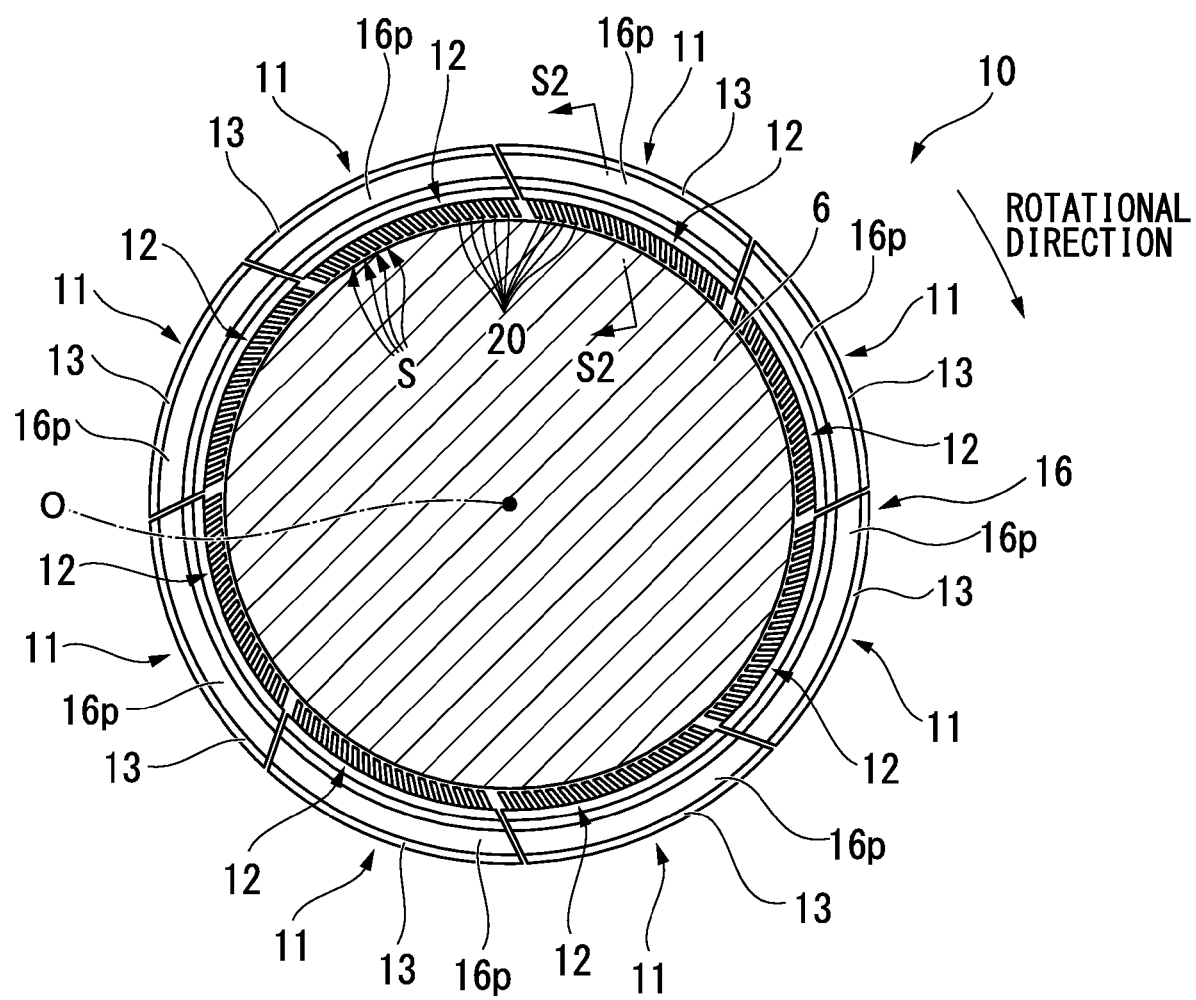
FIG. 2 is a cross-sectional view taken along line S1-S1 in FIG. 1.
Figure 3:
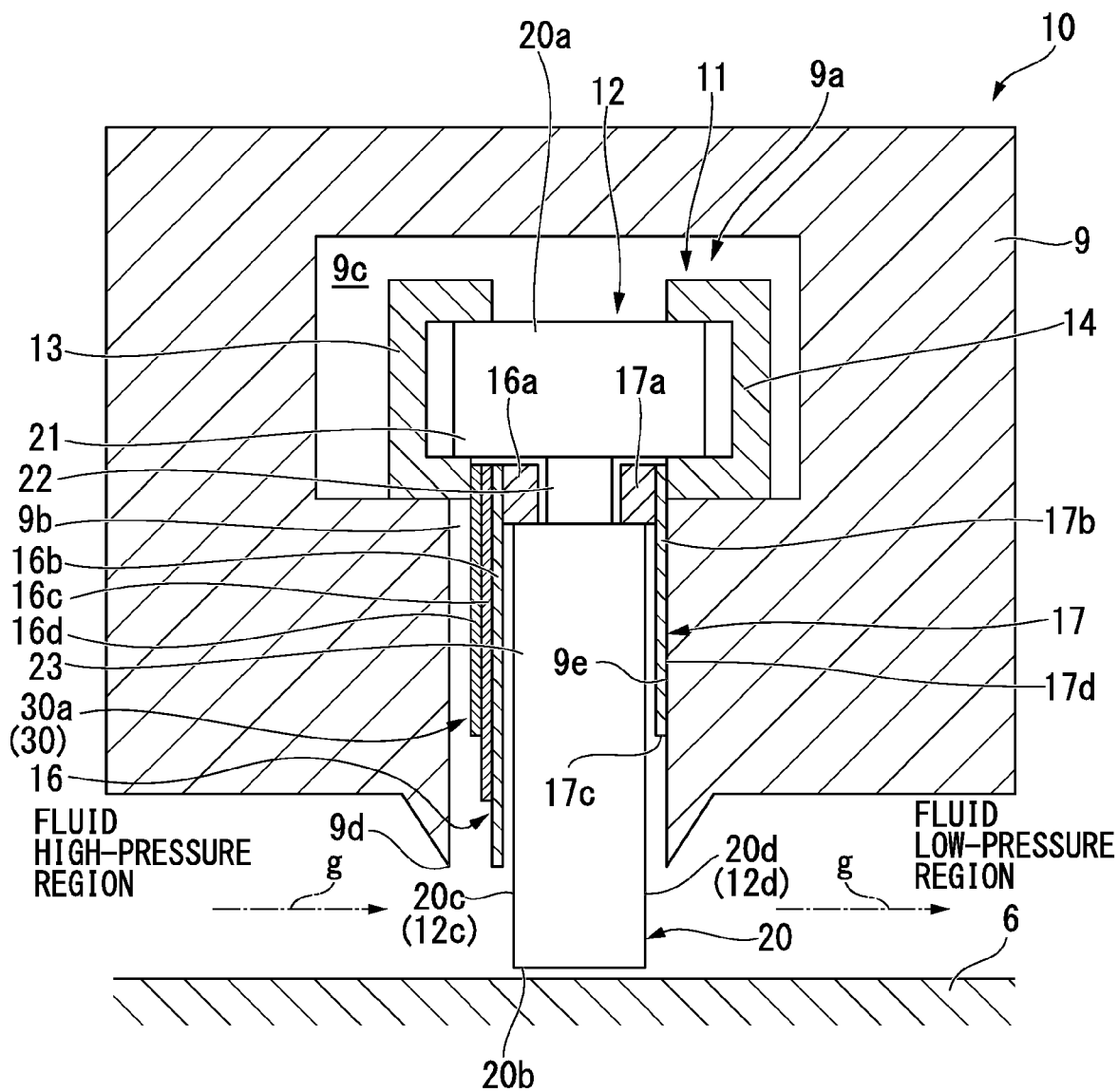
FIG. 3 is a cross-sectional view of a shaft sealing device according to a first embodiment of the present invention taken along line S2-S2 in FIG. 2.

FIG. 2 is a cross-sectional view taken along line S1-S1 in FIG. 1, and FIG. 3 is a cross-sectional view taken along line S2-S2 in FIG. 2.

As shown in FIG. 2, the shaft sealing device 10 of the turbine 4 is configured by arranging a plurality of (eight in the present embodiment) sealing segments 11, which extend in a circular-arc shape, in the circumferential direction within a housing 9 that is an annular space supported by the hub shrouds of the annular turbine vane group 5 and the inner peripheral surface of the bearing 4c, respectively. The sealing segments 11 are segmented so as to go to a forward side in a rotational direction from a radial outer side toward a radial inner side.

The housing 9 extends over the whole circumference in the circumferential direction along the outer periphery of the rotating shaft 6, and has an annular accommodation space 9a formed therein (see FIG. 3). As shown in FIG. 3, the opening side of the accommodation space 9a of the housing 9, that is, the portion of the accommodation space on the radial inner side serves as an inside space 9b of which the width dimension (dimension in the direction of the axis O) is made small. Additionally, a space spaced apart radially outward from the opening of the accommodation space 9a, that is, a space located further to the radial outer side than the inside space 9b serves as an outside space 9c of which the width dimension is made large. The inside space 9b and the outside space 9c are brought into a mutually communicating state. Also, an opening portion 9d of the inside space 9b faces the rotating shaft 6 on the radial inner side.

The sealing segment 11, as shown in FIG. 3, includes a seal body 12 (refer to FIG. 4), retaining rings 13 and 14, a high-pressure side plate 16, a low-pressure side plate 17, and a rigidity imparting member 30.

The seal body 12 has multiple thin plate sealing pieces 20. The retaining rings 13 and 14 have a U-shaped cross-section and retain the multiple thin plate sealing pieces 20. The high-pressure side plate 16 and the low-pressure side plate 17 are provided so that the seal body 12 is sandwiched therebetween from the direction of the axis O.

Figure 4:
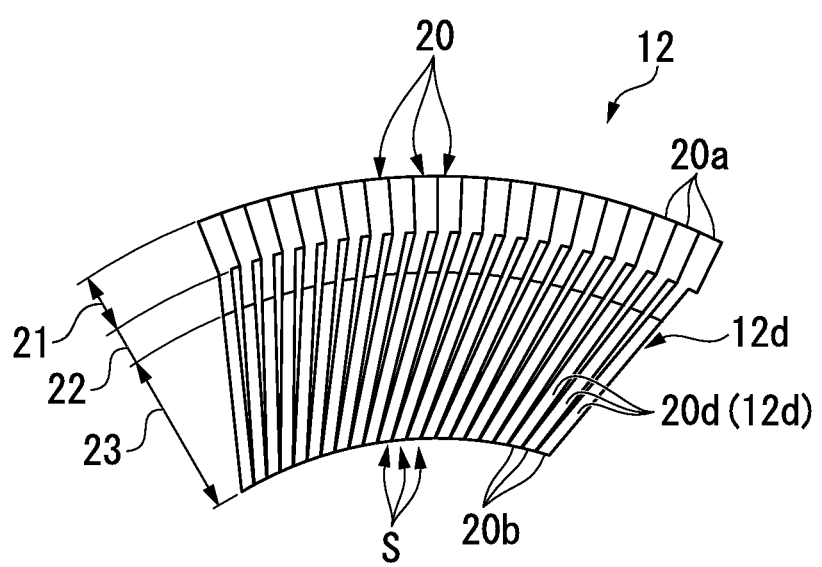
FIG. 4 is the schematic view when the shaft sealing device according to the first embodiment of the present invention is viewed from one axial side to the other axial side in the axial direction.

FIG. 4 is a schematic view when the sealing segment 11 is viewed from one side to the other side in the direction of the axis O.

In the seal body 12, as shown in FIG. 4, the multiple thin plate sealing pieces 20 are stacked (refer to FIG. 2), and the ends of a number of the thin plate sealing pieces 20 on the radial outer side, that is, the rear ends 20a of the thin plate sealing pieces 20 are coupled together. As shown in FIG. 2, the multiple thin plate sealing pieces 20 are disposed so as to go to the forward side in the rotational direction from the radial outer side toward the radial inner side.

Additionally, each thin plate sealing piece 20, as shown in FIG. 3, is a member that is formed of mainly a thin steel sheet, is formed in a T-shape as viewed from the circumferential direction of the rotating shaft 6, and is arranged such that the width direction is turned toward the direction of the axis O of the rotating shaft 6. In other words, the thin plate sealing piece 20 is arranged such that the thickness direction thereof is turned toward the circumferential direction of the rotating shaft 6.

The thin plate sealing piece 20 has a head 21, a body 23 that is formed such that the width dimension and thickness dimension thereof are smaller than those of the head 21, and a neck 22 that is located between the head 21 and the body 23 and is formed such that the width dimension thereof is smaller than the width dimension of the head and the body. The thin plate sealing piece 20 is formed so as to be continuous in order of the head 21, the neck 22, and the body 23 from the radial outer side of the rotating shaft 6 toward the radial inner side thereof.

The multiple thin plate sealing pieces 20 are mutually coupled by their respective heads 21 being welded to each other. Additionally, the bodies 23 of the multiple thin plate sealing pieces 20 are made elastically deformable, and the end portions of the respective bodies 23 on the radial inner side, that is, the tips 20b of the thin plate sealing pieces 20 are free ends. The tips 20b of the respective thin plate sealing pieces 20 come into contact with the rotating shaft 6 at predetermined precompression at the time of the stop of the rotating shaft 6.

As shown in FIG. 4, the multiple thin plate sealing pieces 20 are arranged with small clearances s between each other in the circumferential direction. In the thin plate sealing pieces 20, the thickness dimension of the head 21 is set to be larger than the thickness dimension of the neck 22 and the body 23, whereby a small clearance s is formed between the bodies 23 of two thin plate sealing pieces 20 that are adjacent to each other in the thickness direction.

In the seal body 12 including such multiple thin plate sealing pieces 20, high-pressure side end portions (other end portions) 12c is faced to a fluid high-pressure region (the other side of the axial direction), wherein the high-pressure side end portions 12c are formed in the shape of a layered structure which is configured by multiple side end portions 20c of the bodies 23 of the respective thin plate sealing pieces 20. Moreover, low-pressure side end portions 12d is faced to a fluid low-pressure region (the one side of the axial direction), wherein the low-pressure side end portions 12d are formed in the shape of a layered structure which is configured by multiple side end portions 20d of the body 23.

The retaining rings 13 and 14 are members that extend in the circumferential direction of the rotating shaft 6, and both are formed in a U-shape in a cross-section including the axis O. The portions of the heads 21 of the thin plate sealing pieces 20 on the high-pressure side are fitted into a groove portion of the retaining ring 13, and the portions of the heads 21 of the thin plate sealing pieces 20 on the low-pressure side are fitted into a groove portion of the retaining ring 14. Accordingly, the heads 21 of the multiple thin plate sealing pieces 20 are retained by the retaining rings 13 and 14.

As shown in FIG. 2, the thickness direction of the high-pressure side plate 16 is turned to the direction of the axis O and the shape thereof as viewed from the direction of axis O of the rotating shaft 6 is a circular-arc strip shape. Additionally, the high-pressure side plate 16 is segmented in the circumferential direction into a plurality of portions (eight in the present embodiment) so as to go to the forward side in the rotational direction from a radial outer side toward the radial inner side. Additionally, each of the segmented high-pressure side plate pieces 16p is disposed with a clearance from an adjacent high-pressure side plate piece 16p.

Additionally, as shown in FIG. 3, the high-pressure side plate 16 has a base portion 16a that is an end portion on the radial outer side, and a sealing plate portion 16b that extends from the base portion 16a toward the radial inner side.

The base portion 16a of the high-pressure side plate 16 is retained by the retaining ring 13 so as not to be dropped in the radial direction in a state where the base portion has entered a recess on the high-pressure side between the head 21 and the body 23 of the thin plate sealing piece 20. Additionally, the base portion 16a has a thickness (the dimension in the direction of the axis O) that is larger than the thickness (the dimension in the direction of the axis O) of the sealing plate portion 16b, and protrudes in the direction of the axis O with the sealing plate portion 16b as a reference.

The sealing plate portion 16b of the high-pressure side plate 16 extends toward the radial inner side such that the end portion thereof on the radial outer side is aligned with the end portion of the base portion 16a on the radial outer side and so as to be stacked on the surface of the base portion 16a that faces the fluid high-pressure region. Additionally, the end portion of the sealing plate portion 16b, that is, the tip of the sealing plate portion 16b extends to the opening portion 9d of the accommodation space 9a on the radial inner side. Accordingly, the tip 20b of the thin plate sealing piece 20 that extends from the accommodation space 9a toward the radial inner side extends further toward the radial inner side than the tip of the high-pressure side plate 16.

The rigidity imparting member 30 is arranged so as to be stacked on the surface of the high-pressure side plate 16 that faces the fluid high-pressure region, and imparts rigidity in the direction of the axis O to a portion of the high-pressure side plates 16. In the present embodiment, the rigidity imparting member 30 has a supporting plate portion 30a. The supporting plate portion 30a has a first plate piece 16c stacked on the surface of the sealing plate portion 16b that faces the fluid high-pressure region, and a second plate piece 16d stacked on the surface of the first plate piece 16c that faces the fluid high-pressure region.

Figure 5:
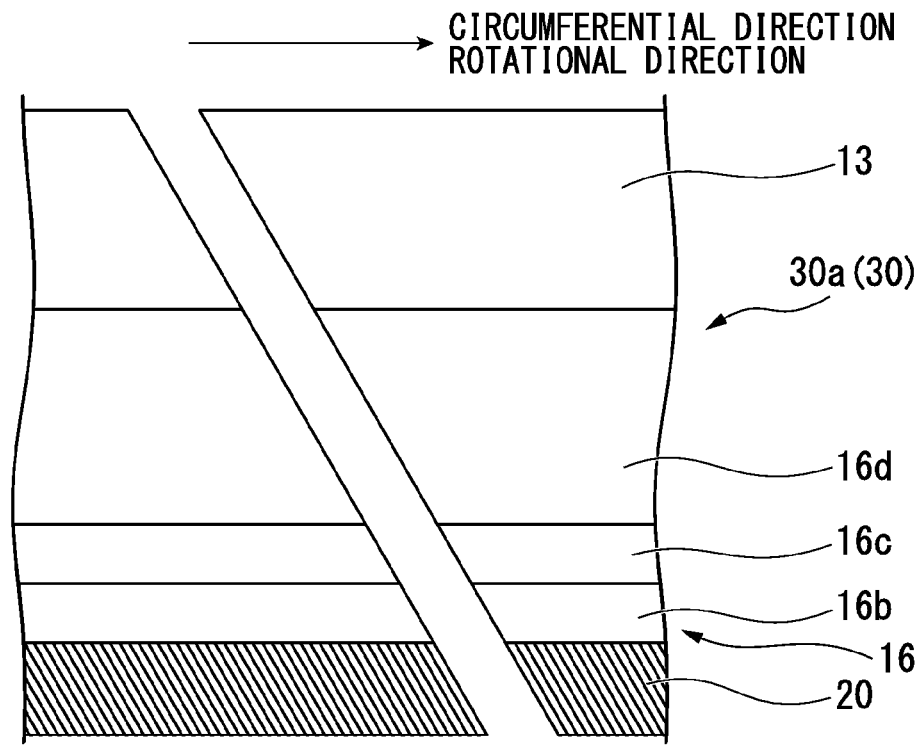
FIG. 5 is the schematic view when a high-pressure side plate of the shaft sealing device according to the first embodiment of the present invention is viewed from one axial side to the other axial side in the axial direction.
Figure 6:
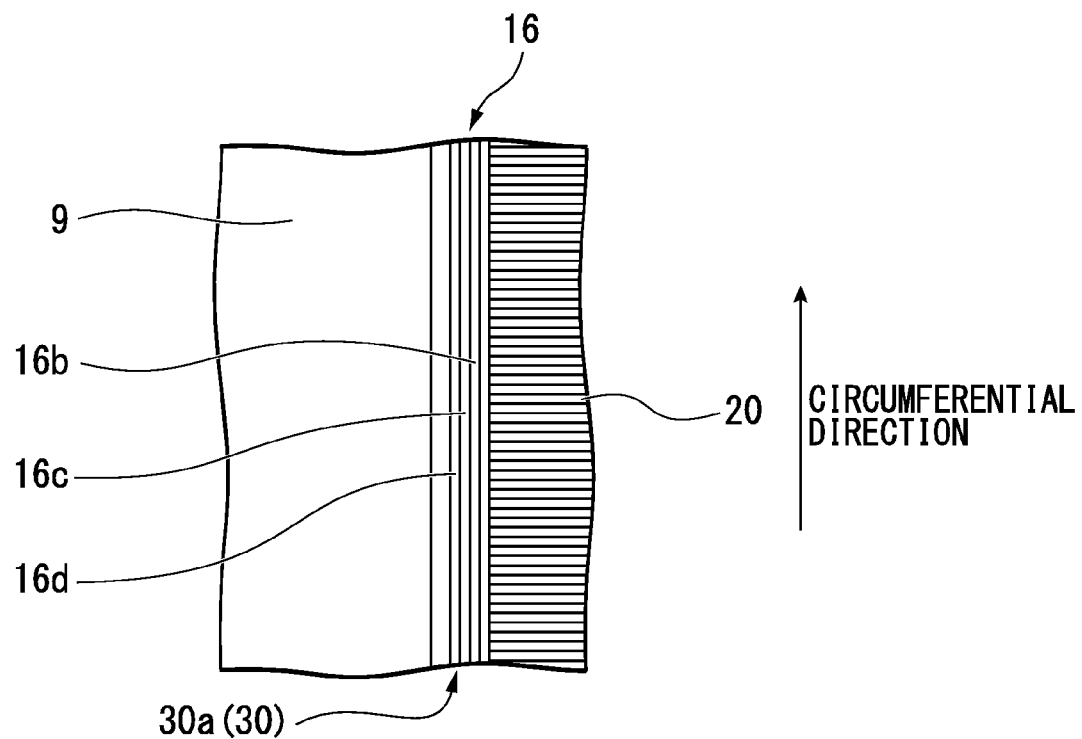
FIG. 6 is a schematic view when the shaft sealing device according to the first embodiment of the present invention is viewed from a radial inner side to a radial outer side.

As shown in FIGS. 3, 5, and 6, the end portion of the first plate piece 16c on the radial outer side is aligned with the end portion of the sealing plate portion 16b on the radial outer side. The first plate piece 16c extends toward the radial inner side so as to be stacked on the surface of the sealing plate portion 16b that faces the fluid high-pressure region. Additionally, the radial dimension (extending length) of the first plate piece 16c is shorter than the radial dimension (extending length) of the sealing plate portion 16b. In other words, the end portion of the first plate piece 16c, that is, the tip of the first plate piece 16c, extends further toward the radial outer side than the tip of the sealing plate portion 16b.

The second plate piece 16d extends toward the radial inner side such that the end portion thereof on the radial outer side is aligned with the end portion of the first plate piece 16c on the radial outer side and so as to be stacked on the surface of the first plate piece 16c that faces the fluid high-pressure region. Additionally, the radial dimension (extending length) of the second plate piece 16d is shorter than the radial dimension (extending length) of the first plate piece 16c. In other words, the end portion of the second plate piece 16d, that is, the tip of the second plate piece 16d, extends further toward the radial outer side than the tip of the first plate piece 16c.

In this way, the respective radial dimensions (extending lengths) of the sealing plate portion 16b, the first plate piece 16c, and the second plate piece 16d are set so as to become shorter in this order. In other words, the radial length of the supporting plate portion 30a is made shorter than that of the high-pressure side plate 16.

Additionally, the radial dimension (extending length) of the first plate piece 16c is set to about two-thirds of the radial dimension (extending length) of the sealing plate portion 16b.

Additionally, the base portion 16a, the sealing plate portion 16b, the first plate piece 16c, and the second plate piece 16d are fixed by spot welding or the like on the radial outer side. On the other hand, the base portion, the sealing plate portion, the first plate piece, and the second plate piece become free ends on the radial inner side.

In addition, the above dimensions are an example and are not limited to the numbers concerned.

On the other hand, the thickness direction of the low-pressure side plate 17 is turned to the direction of the axis O and the shape thereof as viewed from the direction of the axis O of the rotating shaft 6 is a circular-arc strip shape. Additionally, the low-pressure side plate 17 has a base portion 17a that is an end portion on the radial outer side, and a sealing plate portion 17b that extends from the base portion 17a toward the radial inner side.

The base portion 17a of the low-pressure side plate 17 is pressed from the low-pressure side by the retaining ring 14 in a state where the base portion has entered a recess on the low-pressure side between the head 21 and the body 23 of the thin plate sealing piece 20.

Additionally, the base portion 17a has a thickness (the dimension in the direction of the axis O) that is larger than the thickness of the sealing plate portion 17b, and protrudes in the direction of the axis O with the sealing plate portion 17b as a reference.

The end portion of the sealing plate portion 17b of the low-pressure side plate 17 on the radial outer side is aligned with the end portion of the base portion 17a on the radial outer side. Additionally, the sealing plate portion 17b extends toward the radial inner side so as to be stacked on the surface of the base portion 16a that faces the fluid high-pressure region. Additionally, the end portion of the sealing plate portion 17b, that is, the tip of the sealing plate portion 17b extends further toward the radial inner side than the opening portion 9d of the accommodation space 9a on the radial inner side. Additionally, the radial dimension of the sealing plate portion 17b is shorter than the radial dimension of the sealing plate portion 16b.

Additionally, the base portion 17a and the sealing plate portion 17b are fixed by spot welding or the like on the radial outer side.

The sealing segment 11, as shown in FIG. 3, is accommodated in the accommodation space 9a of the housing 9 with a clearance.

More specifically, the retaining rings 13 and 14 that retain the head 21 of the thin plate sealing piece 20 are accommodated in the outside space 9c of the accommodation space 9a, and the high-pressure side plate 16, the low-pressure side plate 17, and the body 23 of the thin plate sealing piece 20 are accommodated in the inside space 9b of the accommodation space 9a. Also, the tip of the body 23, that is, the tip 20b of the thin plate sealing piece 20 protrudes toward the rotating shaft 6 from the opening of the accommodation space 9a.

The radial displacement of the sealing segment 11 is restricted as the retaining rings 13 and 14 interfere with the inner wall surface of the outside space 9c of the housing 9, and the displacement thereof in the direction of the axis O is restricted within a predetermined range as the high-pressure side plate 16 and the low-pressure side plate 17 interfere with the inner wall surface of the inside space 9b of the housing 9. In addition, the sealing segment 11 is biased to the radial inner side by an elastic body (not shown) provided in the outside space 9c.

When the gas turbine 1 is operated, the above-described sealing segment 11 is displaced to the fluid low-pressure region side by the pressure of the combustion gas g. Accordingly, as shown in FIG. 3, the plate surface 17d of the low-pressure side plate 17 is pressed against an inner wall surface 9e of the housing 9 (the inside space 9b) facing in the direction of the axis O.

Next, the flow and action of the combustion gas g in the shaft sealing device 10 configured in this way will be described.

When the gas turbine 1 is started from a stopped state, the pressure differential between the low-pressure region and the high-pressure region becomes large, and the sealing segment 11 is pressed toward the low-pressure region by the combustion gas g in proportion to the pressure differential. In this case, the combustion gas g that flows from the high-pressure region to the low-pressure region passes through the small clearances s of the thin plate sealing pieces 20 of the seal body 12.

Then, if the pressure differential between the fluid low-pressure region and the fluid high-pressure region becomes equal to or larger than a predetermined value, the plate surface 17d of the low-pressure side plate 17 that faces the low-pressure side comes into close contact with the inner wall surface 9e as the combustion gas g presses the seal body 12 and the low-pressure side plate 17 as a whole. Additionally, in the fluid high-pressure region, the combustion gas g presses the high-pressure side plate 16 toward the seal body 12 as a whole.

In the shaft sealing device 10 configured in this way, the supporting plate portion 30a is provided on the surface of the sealing plate portion 16b that faces the fluid high-pressure region. Therefore, the rigidity of the high-pressure side plate 16 can be reliably increased. Accordingly, even if vibration is generated in the high-pressure side plate 16 when the gas turbine 1 has rotated, strength is increased to such a degree that this vibration can be resisted. Additionally, since the high-pressure side plate 16 has high rigidity, fluttering thereof can be prevented, and there is no concern of the shaft sealing device 10 being damaged.

Additionally, since the radial dimension of the supporting plate portion 30a is shorter than the radial dimension of the sealing plate portion 16b, the rigidity of the high-pressure side plate 16 is not excessively increased, and the radial inner side of the supporting plate portion 30a serves as a free end. Hence, even if the tips 20b that are free ends of the thin plate sealing pieces 20 has changed in shape when the gas turbine 1 has rotated, flexibility remains to such a degree to cope with the thin plate sealing pieces 20. Therefore, the high-pressure side plate 16 can be reliably made to follow the thin plate sealing pieces 20.

Moreover, since the radial dimension of the second plate piece 16d of the supporting plate portion 30a is shorter than the radial dimension of the first plate piece 16c, the rigidity of the high-pressure side plate 16 can be gradually increased from the radial inner side toward the radial outer side. Moreover, the followability to the thin plate sealing pieces 20 can be gradually secured from the radial outer side toward the radial inner side. Accordingly, rigidity enhancement and securing of the followability can be more flexibly realized.

Additionally, due to a simple configuration in which the supporting plate portion 30a is simply attached to the high-pressure side plate 16, manufacturing can be easily performed.

Second Embodiment

Figure 7:
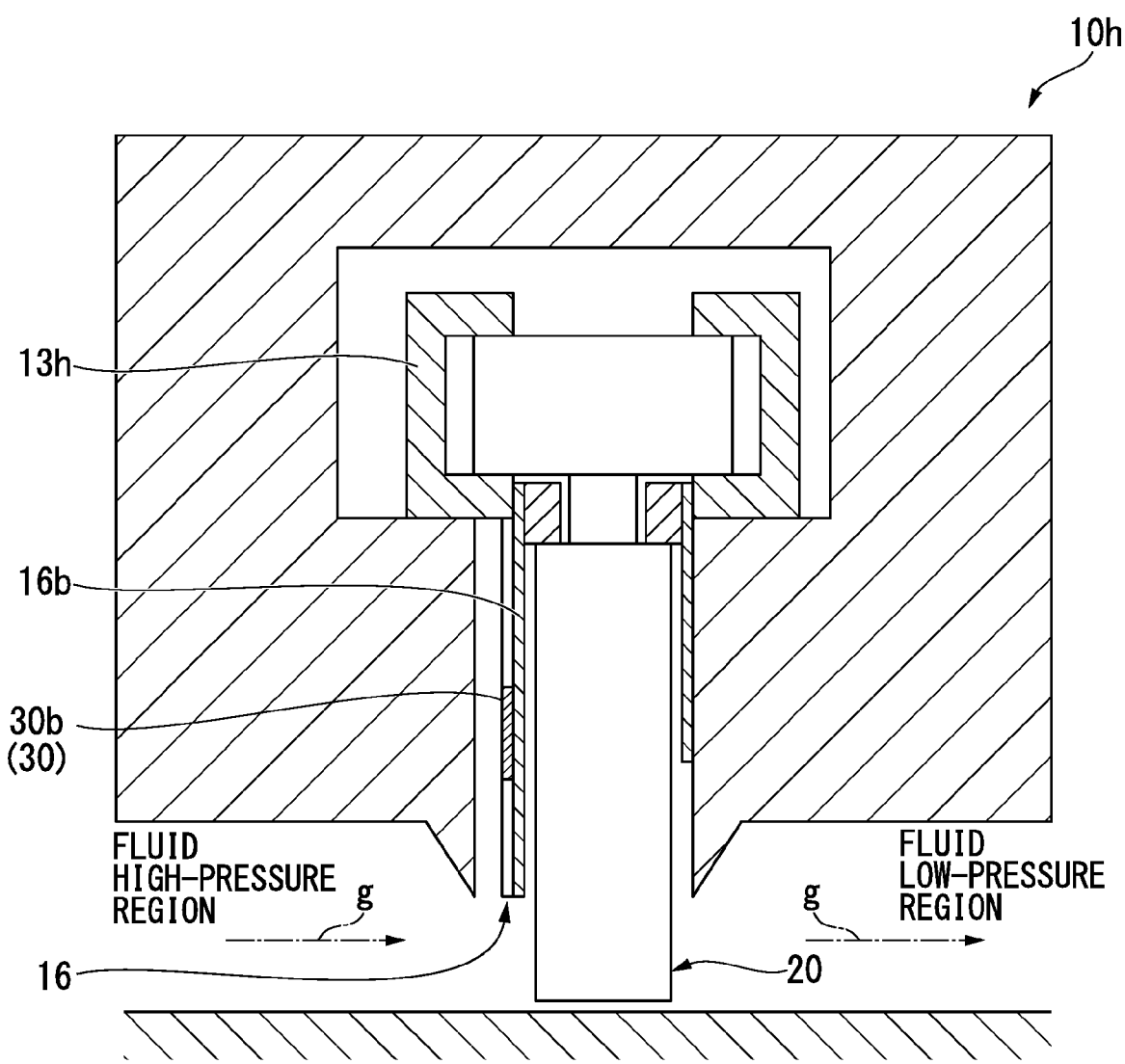
FIG. 7 is a cross-sectional view of a shaft sealing device according to a second embodiment of the present invention taken along line S2-S2 in FIG. 2.
Figure 8:
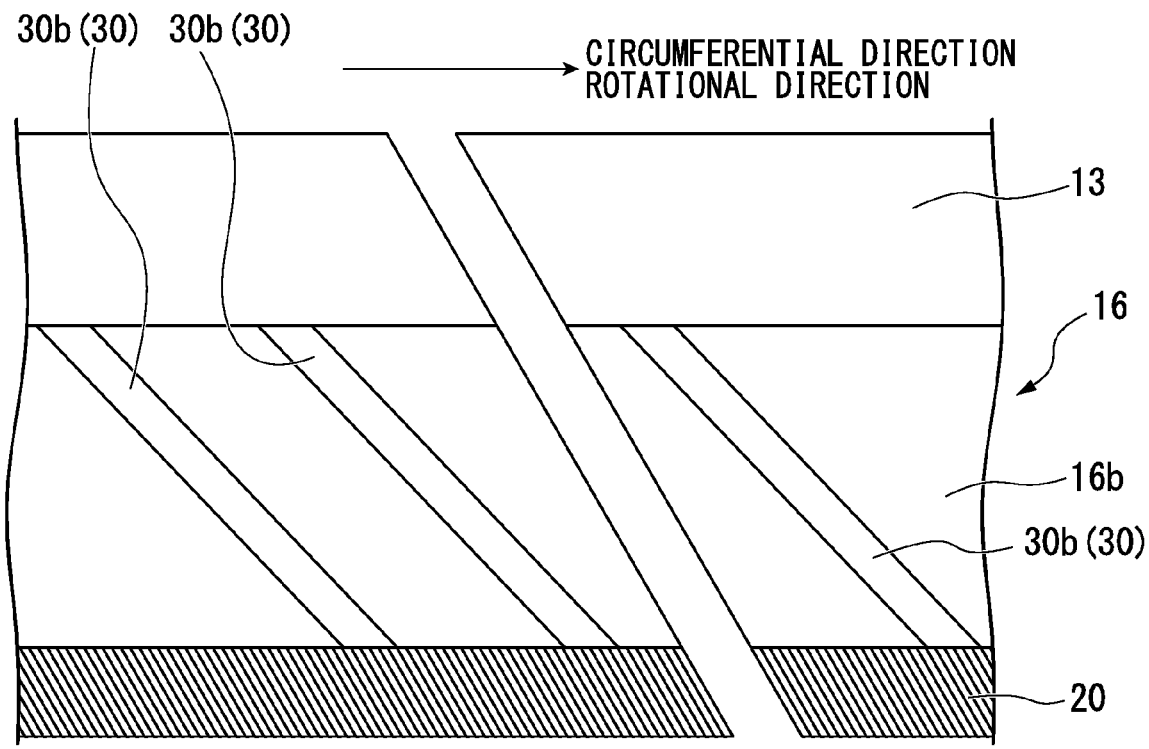
FIG. 8 is the schematic view when a high-pressure side plate of the shaft sealing device according to the second embodiment of the present invention is viewed from one axial side to the other axial side in the axial direction.
Figure 9:
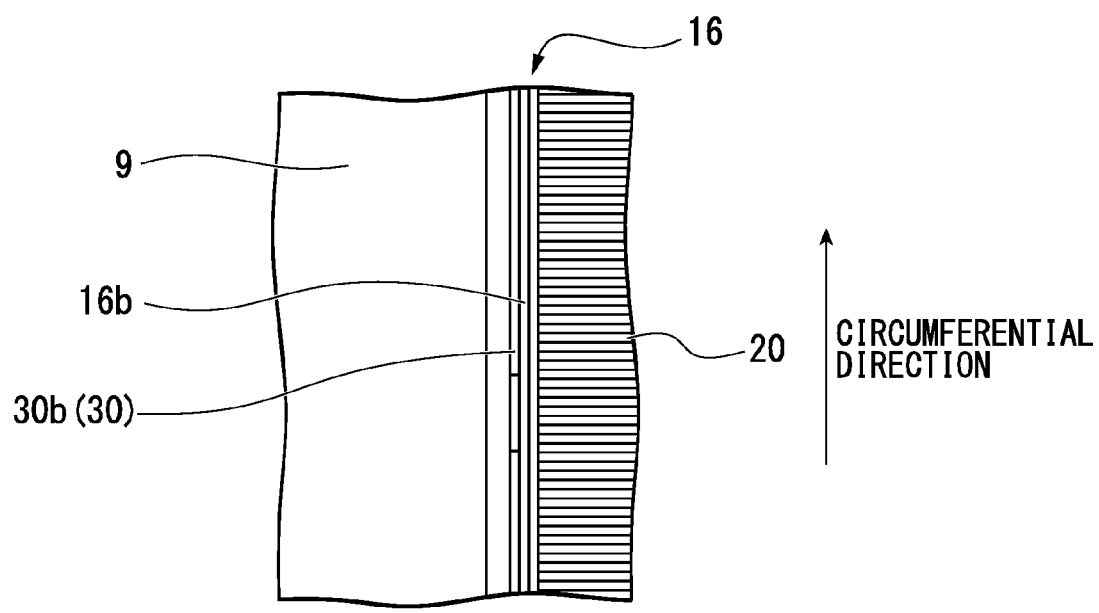
FIG. 9 is a schematic view when the shaft sealing device according to the second embodiment of the present invention is viewed from a radial inner side to a radial outer side.

A rotating machine according to a second embodiment of the present invention will be described below with reference to FIGS. 7 to 9.

In this embodiment, members common to members used in the aforementioned embodiment will be designated by the same reference numerals, and a description thereof is omitted here.

The rigidity imparting member 30 has the supporting plate portion 30a in the shaft sealing device 10 of the first embodiment, whereas the rigidity imparting member 30 has a rib 30b in a shaft sealing device 10h of the present embodiment.

A plurality of the ribs 30b are provided at intervals in the circumferential direction on the surface of the sealing plate portion 16b that faces the fluid high-pressure region.

The plurality of ribs 30b are disposed so as to go to the forward side in the rotational direction from the radial outer side of the sealing plate portion 16b to the radial inner side thereof, respectively. Additionally, the end portion of the ribs 30b on the radial outer side are aligned with the end portion of the sealing plate portion 16b on the radial outer side, and the end portions thereof on the radial inner side are aligned with the end portion the sealing plate portion 16b on the radial inner side.

Here, a method of performing surface treatment on the surface of the sealing plate portion 16b, which faces the fluid high-pressure region, by etching to provide irregularities is adopted as a method of providing the ribs 30b on the sealing plate portion 16b. Otherwise, there may be a method of providing the sealing plate portion 16b and the ribs 30b as separate members and fixing the ribs 30b to the surface of the sealing plate portion 16b, which faces the fluid high-pressure region, by thermocompression bonding or welding.

In the shaft sealing device 10h configured in this way, the plurality of ribs 30b are provided at intervals in the circumferential direction over the whole region, from the radial outer side to the radial inner side, of the surface of the sealing plate portion 16b which faces the fluid high-pressure region. Therefore, the rigidity of the high-pressure side plate 16 can be increased over the whole region.

Additionally, since flexibility can be secured in a place where the ribs 30b are not provided, the high-pressure side plate 16 can be made to follow the thin plate sealing pieces 20 over the whole region.

Additionally, the ribs 30b that protrude to the fluid high-pressure region side are provided in the direction of the axis O orthogonal to a swirl flow generated in the circumferential direction. Accordingly, the component of the swirl flow produced when the gas turbine 1 has rotated can be reduced, and an uneven flow can be suppressed. Hence, the fluttering of the high-pressure side plate 16 can be reliably prevented.

Additionally, the forward side of a segmented portion of the high-pressure side plate 16 in the rotational direction has a shape that protrudes so as to go to the forward side in the rotational direction from the radial outer side toward the radial inner side. Here, similarly to the thin plate sealing pieces 20, the ribs 30b are disposed so as to go to the forward side in the rotational direction from the radial outer side of the sealing plate portion 16b toward the radial inner side thereof. Hence, since the ribs 30b can be provided over the whole region of the high-pressure side plate 16, the rigidity of the high-pressure side plate can be increased over the whole region.

Third Embodiment

Figure 10:
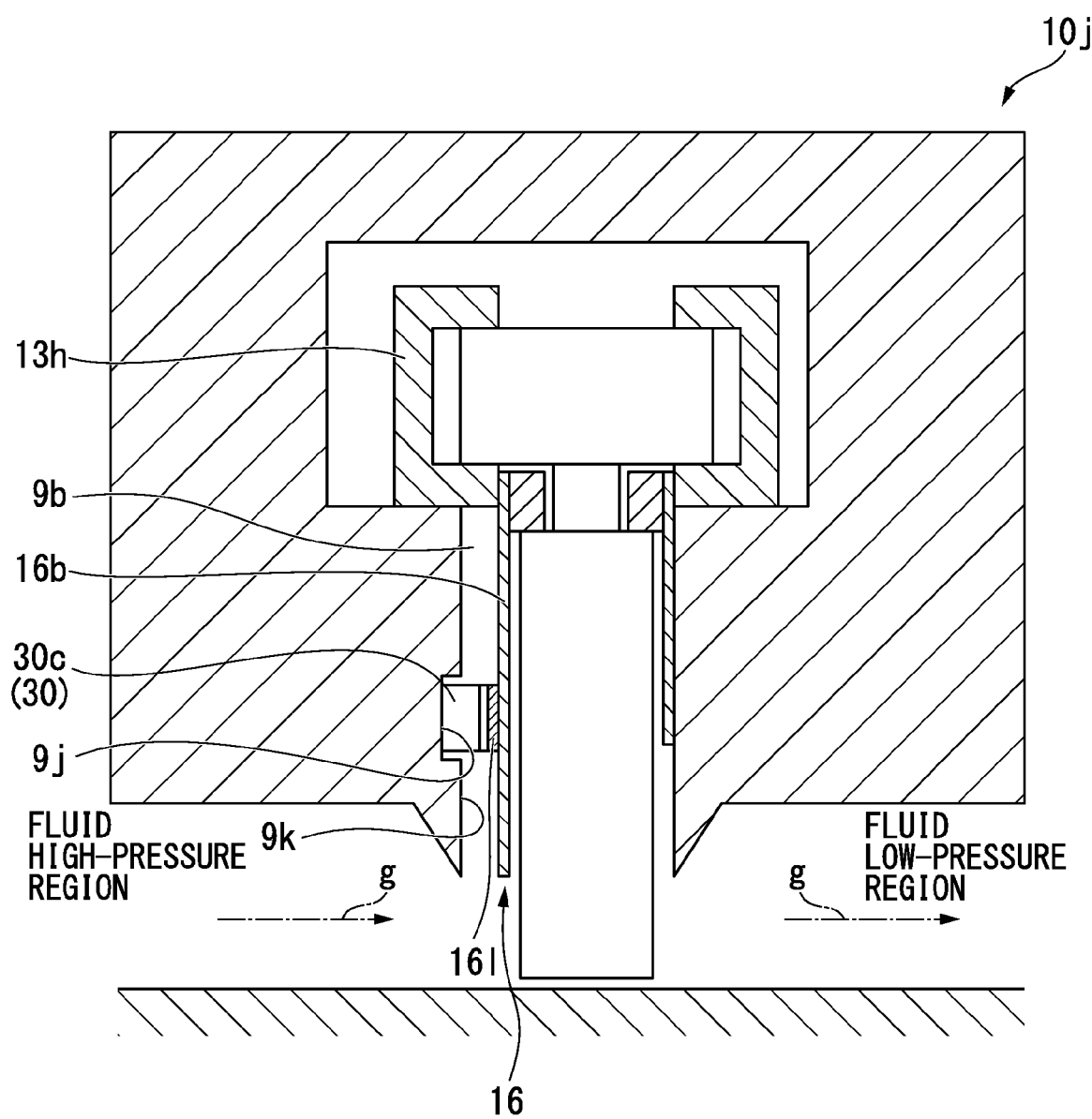
FIG. 10 is a cross-sectional view of a shaft sealing device according to a third embodiment of the present invention taken along line S2-S2 in FIG. 2.
Figure 11:
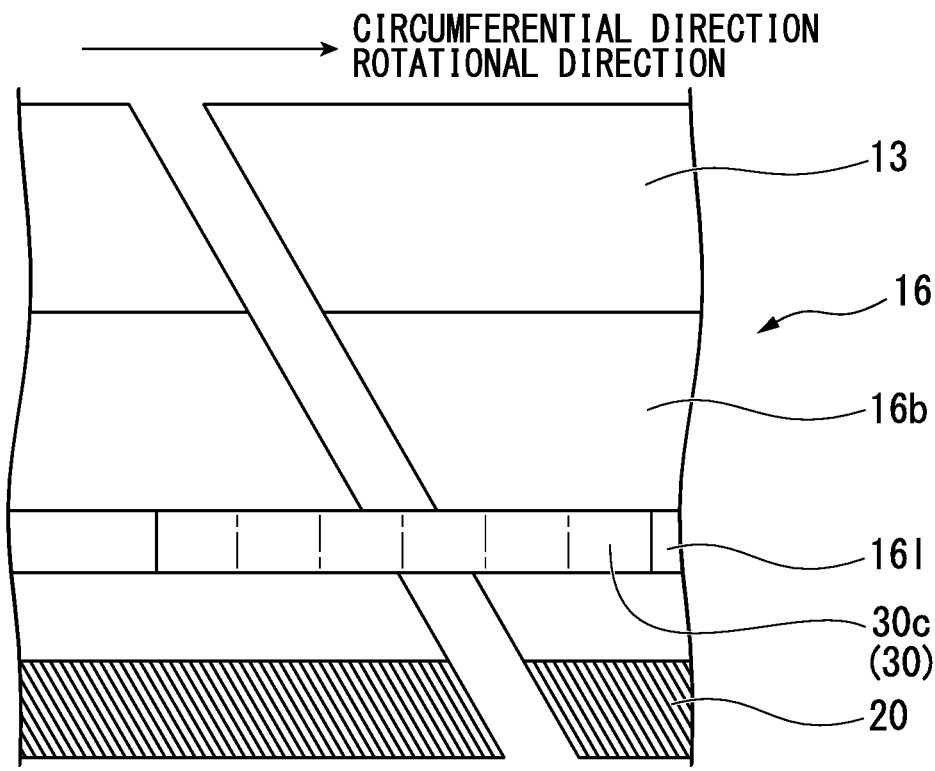
FIG. 11 is the schematic view when a high-pressure side plate of the shaft sealing device according to the third embodiment of the present invention is viewed from one axial side to the other axial side in the axial direction.
Figure 12:
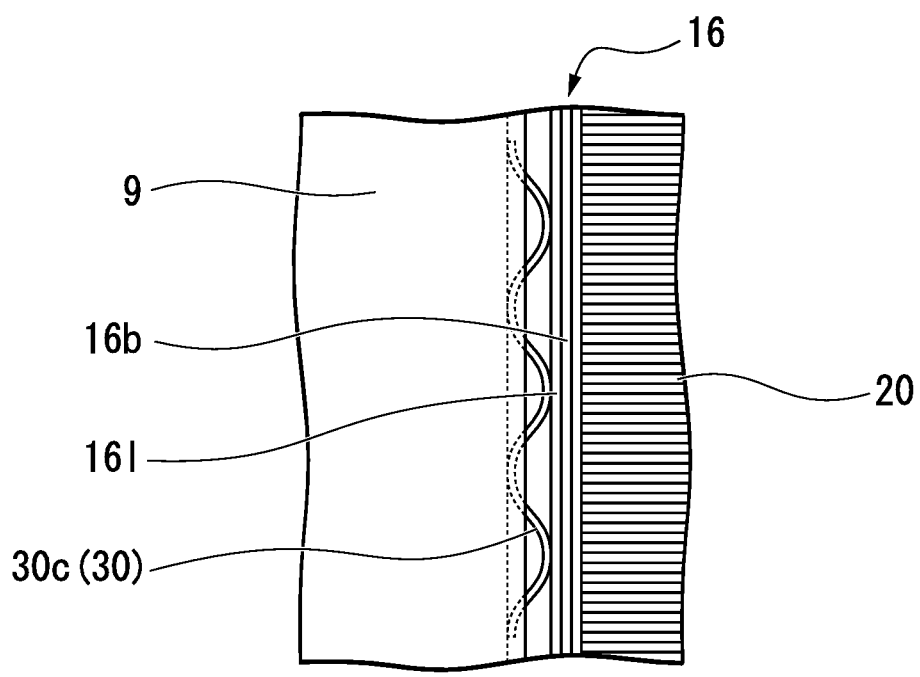
FIG. 12 is a schematic view when the shaft sealing device according to the third embodiment of the present invention is viewed from a radial inner side to a radial outer side.

A rotating machine according to a third embodiment of the present invention will be described below with reference to FIGS. 10 to 12.

In this embodiment, members common to members used in the aforementioned embodiment will be designated by the same reference numerals, and a description thereof is omitted here.

The rigidity imparting member 30 has the supporting plate portion 30a in the shaft sealing device 10 of the first embodiment, whereas the rigidity imparting member 30 has an elastic member 30c in a shaft sealing device 10j of the present embodiment.

Additionally, a recess 9j is provided in the inner wall of the housing 9 formed on the fluid high-pressure region side.

The elastic member 30c is a plate-shaped member that is alternately curved toward one side in the direction of axis O and toward the other side in the direction of axis O, and a holddown member 161 is disposed on the fluid high-pressure region side of the sealing plate portion 16b so as to be interposed between the elastic member and the sealing plate portion 16b. The elastic member 30c presses a portion of the sealing plate portion 16b from the fluid high-pressure region side toward the fluid low-pressure region side. Additionally, the elastic member 30c has the curved one side supported by the inner wall of the recess 9j of the housing 9 on the fluid high-pressure region side and the curved other side supported by the holddown member 161. Here, the elastic member 30c is, for example, a spring, and biases the holddown member 161 from the fluid high-pressure region side toward the fluid low-pressure region side.

The holddown member 161 is a circular-arc member and is provided on the high-pressure region side of the sealing plate portion 16b. Additionally, as the holddown member 161 is biased by the elastic member 30c, the biasing force of the elastic member 30c is transmitted to the sealing plate portion 16b to press the sealing plate portion 16b against the thin plate sealing pieces 20.

The recess 9j of the housing 9 is provided in an inner wall surface 9k in the fluid high-pressure region facing the inside space 9b of the housing 9, has a concave shape formed in the direction of the axis O, and has the elastic member 30c therein.

In the shaft sealing device 10j configured in this way, the elastic member 30c presses the sealing plate portion 16b from the fluid high-pressure region side to the fluid low-pressure region side with the holddown member 161 being interposed therebetween.

Hence, even if the shape of the thin plate sealing pieces 20 varies, the high-pressure side plate 16 can be reliably made to follow the thin plate sealing pieces 20, and the vibration of the high-pressure side plate 16 can be suppressed.

Hence, fluttering can be reliably prevented.

Additionally, since the biasing force of the holddown member 161 can be transmitted over the whole region of the high-pressure side plate 16 by interposing the holddown member 161, the high-pressure side plate 16 can be made to follow the thin plate sealing pieces 20 over the whole region.

Modified Example of Third Embodiment

Figure 13:
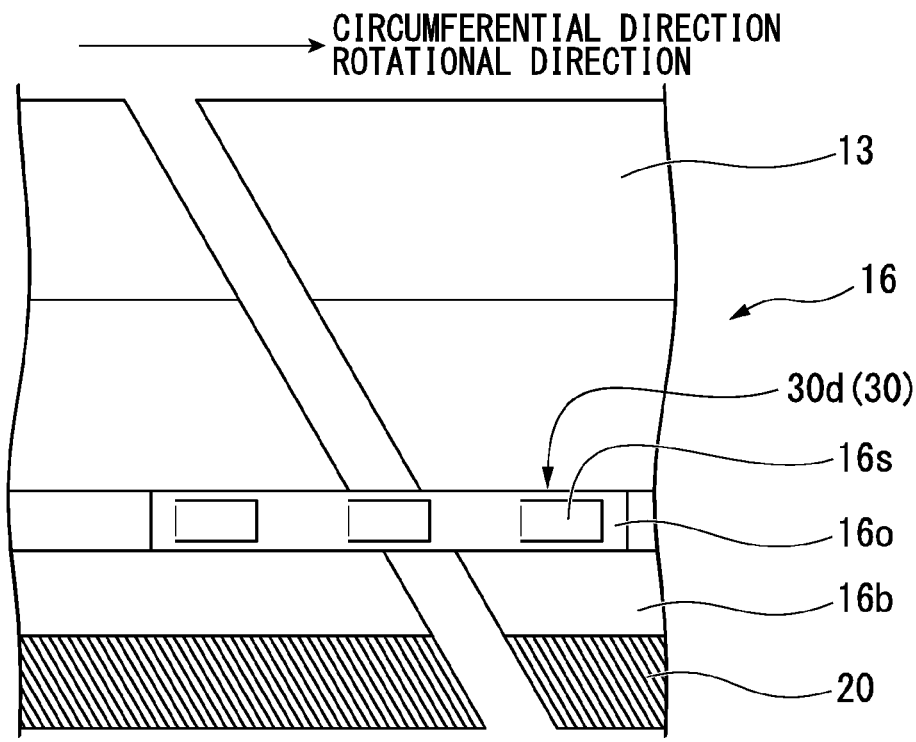
FIG. 13 is the schematic view when a high-pressure side plate of a shaft sealing device according to a modified example of the third embodiment of the present invention is viewed from one axial side to the other axial side in the axial direction.
Figure 14:
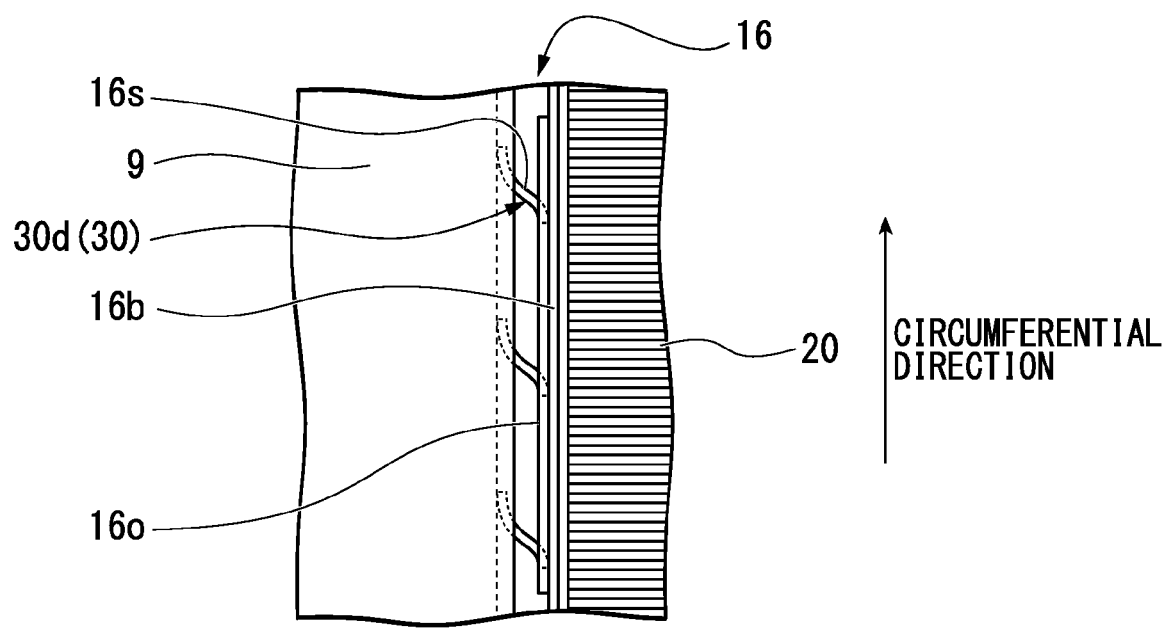
FIG. 14 is a schematic view when a shaft sealing device according to a fourth embodiment of the present invention is viewed from a radial inner side to a radial outer side.

As a modified example of the third embodiment, the elastic member and the holddown member may be integrally provided. That is, as shown in FIGS. 13 and 14, the rigidity imparting member 30 includes the elastic member 30d that presses the sealing plate portion 16b from the fluid high-pressure region side toward the fluid low-pressure region side.

The elastic member 30d has an elastic body 16s that is elastically deformable, and a holddown member 16o that is integrated with the elastic body 16s.

The elastic body 16s is a substantially rectangular member as viewed from the direction of the axis O, and has one side anchored to the holddown member 16o and an opposite one side supported by the inner wall of the recess 9j on the high-pressure region side. Here, the elastic body 16s is pressurized from the inner wall of the recess 9j on the high-pressure region side to transmit a force to bias the holddown member 16o from the fluid high-pressure region side toward the fluid low-pressure region side.

The holddown member 16o is a circular-arc member provided on the high-pressure region side of the sealing plate portion 16b. Additionally, as the holddown member 16o is biased by the elastic body 16s, the biasing force of the elastic body 16s is transmitted to the sealing plate portion 16b to press the sealing plate portion 16b against the thin plate sealing pieces 20.

In addition, the elastic body 16s and the holddown member 16o are formed in an integral molding manner, for example, by press working.

In the shaft sealing device configured in this way, the elastic body 16s is configured integrally with the holddown member 16o, a biasing force can be reliably applied to the high-pressure side plate 16, and the followability can be reliably secured.

Additionally, the attachment of the elastic member 30d to the sealing plate portion 16b is simple, and there is no possibility that the elastic body 16s may deviate from the holddown member 16o due to vibration caused by the rotating machine or the like.

Fourth Embodiment

Figure 15:
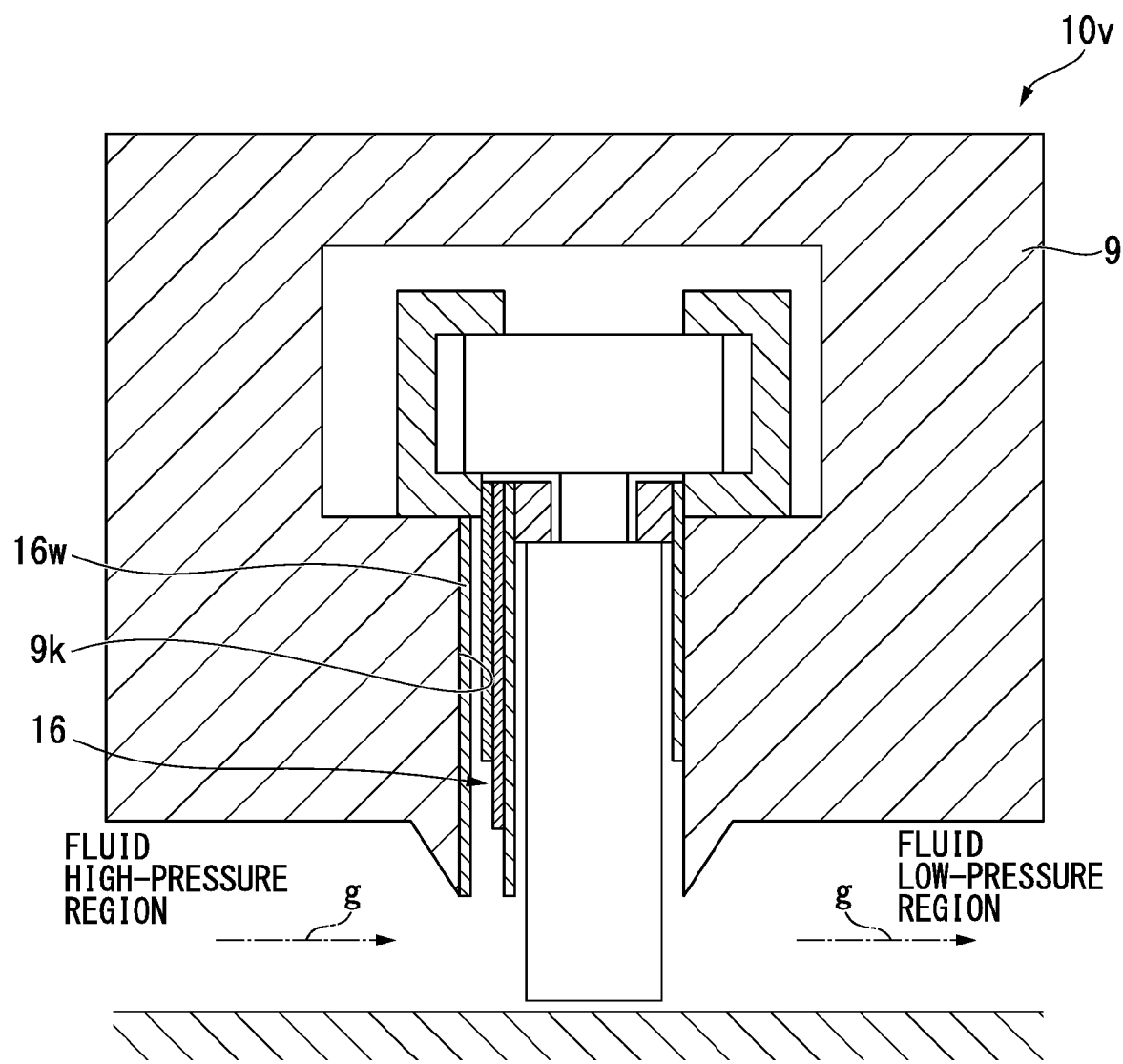
FIG. 15 is a cross-sectional view of the shaft sealing device according to the fourth embodiment of the present invention taken along line S2-S2 in FIG. 2.
Figure 16:
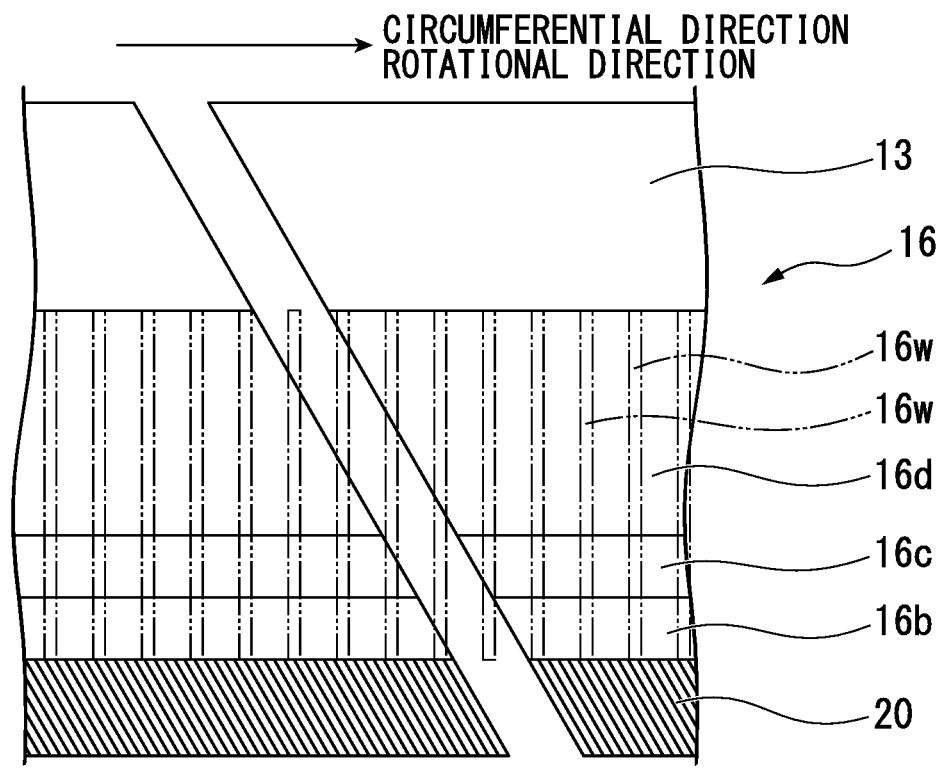
FIG. 16 is the schematic view when a high-pressure side plate of the shaft sealing device according to the fourth embodiment of the present invention is viewed from one axial side to the other axial side in the axial direction.
Figure 17:
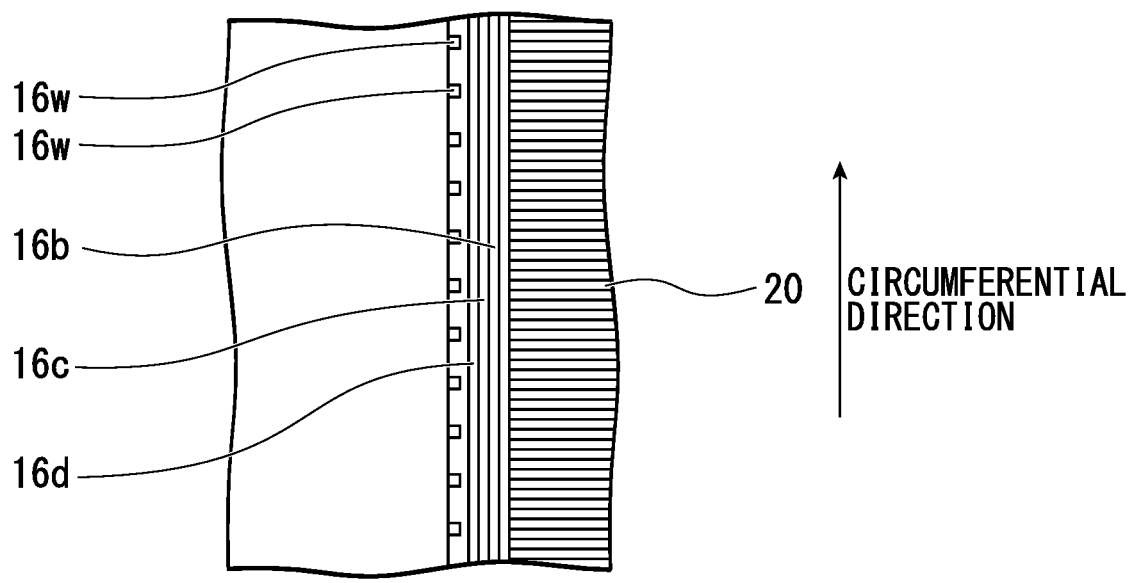
FIG. 17 is a schematic view when the shaft sealing device according to the fourth embodiment of the present invention is viewed from a radial inner side to a radial outer side.

A rotating machine according to a fourth embodiment of the present invention will be described below with reference to FIGS. 15 to 17.

In this embodiment, members common to members used in the aforementioned embodiment will be designated by the same reference numerals, and a description thereof is omitted here.

A shaft sealing device 10v has a plurality of fins 16w provided on the inner wall surface 9k of the housing 9 that is located on the fluid high-pressure region side and that faces the high-pressure side plate 16, in addition to the configuration of the first embodiment.

The plurality of fins 16w are provided to protrude from the inner wall surface 9k of the housing 9 on the fluid high-pressure region side to the fluid low-pressure region side, extend in the radial direction, and are provided at intervals in the circumferential direction.

In the shaft sealing device 10v configured in this way, a swirl flow that is a fluid that flows in the circumferential direction on the fluid high-pressure region side can be reduced, and an uneven flow can be suppressed. Therefore, the fluttering of the high-pressure side plate 16 can be more reliably prevented.

In addition, the assembling procedure, various shapes or combinations of the respective components, and the like, which are shown in the above-described embodiments, are examples, and can be variously changed on the basis of design requirements or the like without departing from the scope of the present invention.

For example, the rigidity imparting member 30 may be provided in the vicinity of the end portion of the high-pressure side plate piece 16p, that is, only in the vicinity of the segmented portion of the high-pressure side plate 16 in the circumferential direction.

In this case, even when an uneven flow has occurred due to a swirl flow and a flow in the vicinity of the segmented portion, the fluttering of the high-pressure side plate 16 can be reliably prevented.

Additionally, although the supporting plate portion 30a in the first embodiment includes two parts of the first plate piece 16c and the second plate piece 16d, the first plate piece 16c and the second plate piece 16d may be integrally one part. Otherwise, a configuration in which the second plate piece 16d is not provided or a configuration in which the sealing plate portion 16b and the supporting plate portion 30a are one integrated part may be adopted. Accordingly, the number of parts of the shaft sealing device 10 can be suppressed, and the management of parts is reduced.

On the other hand, the supporting plate portion 30a may include not only two parts of the first plate piece 16c and the second plate piece 16d, but also a greater number of plate pieces. Accordingly, it is possible to more flexibly cope with a position where the rigidity of the high-pressure side plate 16 is increased, and a position where the followability is improved.

Additionally, although the fourth embodiment includes the fins 16w in addition to the configuration of the first embodiment, the fourth embodiment may include the fins 16w in addition to the configuration of the second embodiment or the third embodiment.

Additionally, in the fourth embodiment, the fins 16w may be provided so as to go to the backward side in the rotational direction from the radial outer side toward the radial inner side. In this configuration, as the fins 16w are provided in a direction that intersects a swirl flow, it is possible to more reliably suppress the flow velocity of the swirl flow.

REFERENCE SIGNS LIST

1: GAS TURBINE (ROTATING MACHINE)
4A: ROTOR
4B: STATOR
9: ANNULAR SPACE
10, 10c, 10h, 10j, 10v: SHAFT SEALING DEVICE
12: SEAL BODY
20: THIN PLATE SEALING PIECE
16: HIGH-PRESSURE SIDE PLATE
16c: FIRST PLATE PIECE (PLATE PIECE)
16d: SECOND PLATE PIECE (PLATE PIECE)
30: RIGIDITY IMPARTING MEMBER
30a: SUPPORTING PLATE PORTION
30b: RIB
30c, 30d: ELASTIC MEMBER
16w: FIN

The invention claimed is:

1. A shaft sealing device provided in an annular space between a rotor and a stator surrounding an outer periphery of the rotor to divide the annular space into a high-pressure region and a low-pressure region in a direction of an axis of the rotor, the shaft sealing device comprising:
  a seal body having a plurality of thin plate sealing pieces that extend from the stator toward a radial inner side of the rotor and are stacked in a circumferential direction of the rotor;
  a high-pressure side plate that extends from the stator toward a radial inner side so as to run along a high-pressure side of the seal body, and is segmented into a plurality of portions in the circumferential direction; and
  a rigidity imparting member configured to impart rigidity in the direction of the axis of the rotor to a portion of a surface of the high-pressure side plate that faces the high-pressure region,
  wherein the rigidity imparting member is a supporting plate portion comprising a first plate piece and a second plate piece,
  wherein the first plate piece is stacked on the surface of the high-pressure side plate that faces the high-pressure region, and extends from the stator toward the radial inner side, wherein a longitudinal length of the first plate piece is shorter than the high-pressure side plate, and
  wherein the second plate piece is stacked on the surface of the first plate piece that faces the high-pressure region, and extends from the stator toward the radial inner side, wherein a longitudinal length of the second plate piece is shorter than the first plate piece.

2. The shaft sealing device according to claim 1, further comprising:
a plurality of fins, which extend in the radial direction, is arranged at intervals in the circumferential direction, and is configured to suppress a fluid that flows in the circumferential direction, in an entire area of an inner wall surface facing the surface of the high-pressure side plate that faces the high-pressure region.

3. A shaft sealing device provided in an annular space between a rotor and a stator surrounding an outer periphery of the rotor to divide the annular space into a high-pressure region and a low-pressure region in a direction of an axis of the rotor, the shaft sealing device comprising:
a seal body having a plurality of thin plate sealing pieces that extend from the stator toward a radial inner side of the rotor and are stacked in a circumferential direction of the rotor;
a high-pressure side plate that extends from the stator toward the radial inner side so as to run along a high-pressure side of the seal body, and is segmented into a plurality of portions in the circumferential direction; and
a rigidity imparting member configured to impart rigidity in the direction of the axis of the rotor to a portion of a surface of the high-pressure side plate that faces the high-pressure region,
wherein the rigidity imparting member is a plurality of ribs formed integrally with the surface of the high-pressure side plate that faces the high-pressure region, and
wherein the plurality of ribs is arranged at intervals in the circumferential direction.

4. The shaft sealing device according to claim 3,
wherein the thin plate sealing pieces extend toward a forward side in a rotational direction of the rotor as the thin plate sealing pieces extend toward the radial inner side, and
wherein the ribs extend toward the forward side in the rotational direction as the ribs extend toward the radial inner side.

5. A shaft sealing device provided in an annular space between a rotor and a stator surrounding an outer periphery of the rotor to divide the annular space into a high-pressure region and a low-pressure region in a direction of an axis of the rotor, the shaft sealing device comprising:
a seal body having a plurality of thin plate sealing pieces that extend from the stator toward a radial inner side of the rotor and are stacked in a circumferential direction of the rotor;
a high-pressure side plate that extends from the stator toward the radial inner side so as to run along a high-pressure side of the seal body, and is segmented into a plurality of portions in the circumferential direction; and
a rigidity imparting member configured to impart rigidity in the direction of the axis of the rotor to a portion of a surface of the high-pressure side plate that faces the high-pressure region,
wherein the rigidity imparting member is an elastic member that presses a portion of the high-pressure side plate from the high-pressure region side toward the low-pressure region side, and
wherein in an entire area of an inner wall surface facing the surface of the high-pressure side plate that faces the high-pressure region, a plurality of fins, which extend in the radial direction, is arranged at intervals in the circumferential direction, and is configured to suppress a fluid that flows in the circumferential direction.

6. A rotating machine comprising:
the shaft sealing device according to claim 1.

* * * * *